(12) United States Patent
Ichikawa et al.

(10) Patent No.: US 8,528,398 B2
(45) Date of Patent: Sep. 10, 2013

(54) SHEET SAG EVALUATION METHOD AND DEVICE

(75) Inventors: Shigeru Ichikawa, Shizuoka (JP); Masahiro Ikeda, Ibaraki (JP)

(73) Assignees: Maysun Corporation, Shizuoka; Yupo Corporation, Tokyo (JP)

( * ) Notice: Subject to any disclaimer, the term of this patent is extended or adjusted under 35 U.S.C. 154(b) by 347 days.

(21) Appl. No.: 12/808,188

(22) PCT Filed: Dec. 10, 2008

(86) PCT No.: PCT/JP2008/072394
§ 371 (c)(1),
(2), (4) Date: Sep. 13, 2010

(87) PCT Pub. No.: WO2009/078318
PCT Pub. Date: Jun. 25, 2009

(65) Prior Publication Data
US 2011/0011175 A1    Jan. 20, 2011

(30) Foreign Application Priority Data

Dec. 17, 2007  (JP) ................................ 2007-324677

(51) Int. Cl.
*G01L 5/04* (2006.01)
(52) U.S. Cl.
USPC .......................................................... 73/159
(58) Field of Classification Search
USPC ........................................ 73/159, 866, 865.6
See application file for complete search history.

(56) References Cited

U.S. PATENT DOCUMENTS

| 5,317,913 A * | 6/1994 | Feistkorn et al. ............... 73/159 |
| 2004/0251370 A1 * | 12/2004 | Solberg et al. ............. 242/420.6 |

FOREIGN PATENT DOCUMENTS

| CN | 2672618 | 1/2005 |
| JP | 62-161007 | 7/1987 |
| JP | 1-219609 | 9/1989 |
| JP | 3-11691 | 3/1991 |
| JP | 4-116050 | 4/1992 |
| JP | 9-72731 | 3/1997 |
| JP | 2001-33229 | 2/2001 |
| JP | 2003-214805 | 7/2003 |
| JP | 2009-063499 | 3/2009 |

OTHER PUBLICATIONS

China Office action, dated Nov. 24, 2011 along with an english translation thereof.
Japan Office action, dated Nov. 6, 2012 along with an english translation thereof.
Japan Office action, dated Apr. 23, 2013 along with an english translation thereof.

* cited by examiner

*Primary Examiner* — Peter Macchiarolo
*Assistant Examiner* — Tamiko Bellamy
(74) *Attorney, Agent, or Firm* — Greenblum & Bernstein P.L.C.

(57) ABSTRACT

A touch roller is pressed to the surface of a sheet being conveyed in a space and the amount of displacement of the touch roller is measured to evaluate the sag of the sheet at the position at which the touch roller is pressed against the sheet. The method enables the sag of a sheet to be accurately evaluated with the use of a device having a relatively simple structure and easily maintained.

11 Claims, 7 Drawing Sheets

SHEET SAG EVALUATION METHOD AND DEVICE

TECHNICAL FIELD

The present invention relates to a method for evaluating the sag of a sheet, and to a device for evaluating the sag of a sheet.

BACKGROUND ART

Sheets are utilized in various fields in today's society; and sheets of various materials and compositions are produced industrially. Various standardized goods of sheets are provided in accordance with the objects to which they are applied and with the mode of using them. For example, sheets are produced, having a constant thickness and having a constant length in the longitudinal direction or in the cross direction. However, even such standardized sheets may have a sag depending on the condition in production or during storage. This is because the sheet that shall naturally have a constant length from one end to the other may have a fluctuating length when tension is applied thereto at the two ends. For example, when the length in the longitudinal direction fluctuates, then the sheet may have a sag in the cross direction. When the sheet having such a sag is wound up, the wound roll may be deformed or wrinkled owing to the difference in the winding stiffness. When such a sheet is utilized or applied to objects, it may bring about various defects. For example, when used in printing, register marks could not be arranged in good order, and in multicolor printing, printing deviation may occur.

Such a sagging sheet brings about various problems, and therefore it is said necessary to evaluate the sag of a sheet during sheet production or before shipment. In particular, the industrial requirement is to evaluate the sag of a sheet while the sheet is conveyed in continuous production or continuous treatment thereof.

As a method for evaluating the sag of a sheet being conveyed, for example, proposed is a method of jetting out compression air toward a sheet through plural holes arranged at the top of the air table disposed above rollers for conveying a sheet thereon, thereby evaluating the degree of sagging of the sheet (for example, see Patent Reference 1). According to this method, air leakage occurs in accordance with the sheet tension between the air table and the sheet, and there occurs a pressure change in the air jetting port in accordance with the leakage. The pressure is measured with an air pressure sensor, and a pressure value is thus obtained in accordance with the sheet tension in the cross direction. The found data are plotted as a graph to be a tension profile in the cross direction of the sheet, from which the sag of the sheet in the cross direction can be evaluated.

As another method of evaluating the sag of a sheet being conveyed, there is known a method of using a double-structure roller comprising an inner cylinder and a large number of divided outer cylinders for evaluating the degree of sagging of a sheet (for example, see Patent Reference 2). According to this method, the outer cylinders are kept floating by the air fed through the air holes of the inner cylinder. When a sheet is made run while held around the roller, then the outer cylinders are pushed down by the force corresponding to the sheet tension. With that, the space between the outer cylinders and the inner cylinder changes, therefore producing a pressure difference between the upper part kept in contact with the sheet and the lower part (Pb) not kept in contact with the sheet. This is measured with an air pressure sensor, and from the difference, the value corresponding to the sheet tension is obtained. The found data are plotted as a graph to be a tension profile in the cross direction of the sheet, from which the sag of the sheet in the cross direction can be evaluated.

Patent Reference 1: JP-A 2001-33229
Patent Reference 2: JP-UM-B 3-11691

DISCLOSURE OF THE INVENTION

Problems that the Invention is to Solve

However, these conventional methods have problems to be solved.

The first method using an air table has a problem in that contaminants in air adhere to the air jetting port to change the hole diameter thereby bringing about measurement error. Accordingly, the method requires regular cleaning and takes a lot of time for system maintenance. In addition, in the method, the air jetting out through the air jetting port runs not only in the sheet-traveling direction but also in the cross direction thereby bringing about mutual interference, and therefore the method has another fundamental problem in that the reliability in sagging evaluation in the cross direction is low.

The second method of using a double-structure roller is problematic in that the roller structure is complicated and its manufacture is difficult. In particular, it is structurally difficult to increase the number of the divided parts in the cross direction. Another problem with the method is that, when contaminants in air accumulate in the air nozzle or in the intermediate space between the outer cylinders and the inner cylinder, then there may occur measurement error. It is difficult to remove the contaminants by cleaning and still another problem is that the system maintenance is troublesome.

Given the situation, for the purpose of solving the prior-art problems, the present inventors have promoted investigations aiming at an object of evaluating the sag of a sheet with good accuracy by the use of a device having a relatively simple structure and capable of being maintained with ease.

Means for Solving the Problems

The inventors have assiduously studied so as to solve the above-mentioned problems and, as a result, have found that, when a touch roller is pressed against the surface of a sheet being conveyed and the amount of displacement of the touch roller is measured, then the sag of the sheet can be evaluated with accuracy and in a simplified manner. Specifically, as a means for solving the problems, the following invention is provided herein.

[1] A method for evaluating the sag of a sheet, comprising pressing a touch roller to the surface of a sheet being conveyed in a space and measuring the amount of displacement of the touch roller to thereby evaluate the sag of the sheet at the position at which the touch roller is pressed against the sheet.

[2] The method for evaluating the sag of a sheet of [1], wherein plural measurement points are set in the cross direction of the sheet, the amount of displacement of the touch roller is measured at each measurement point, and a sag profile in the cross direction is formed.

[3] The method for evaluating the sag of a sheet of [2], wherein the touch rollers are pressed individually against the plural measurement points and the amount of displacement of each touch roller is measured to form the sag profile in the cross direction.

[4] The method for evaluating the sag of a sheet of [2], wherein the touch roller is moved in the cross direction of the sheet to measure the amount of displacement of the touch roller at the plural measurement points, thereby forming the sag profile in the cross direction.

[5] The method for evaluating the sag of a sheet of any one of [1] to [4], wherein the amount of displacement of the touch roller is measured with a contact force sensor or a contact or noncontact displacement sensor.

[6] The method for evaluating the sag of a sheet of [5], wherein the force sensor is a strain sensor, or a piezoelectric sensor that takes advantage of piezoelectricity.

[7] The method for evaluating the sag of a sheet of [5], wherein the displacement sensor is a ranging sensor that takes advantage of laser light, IR light or ultrasonic waves; a magnetic sensor; a differential transformer or a linear gauge.

[8] The method for evaluating the sag of a sheet of any one of [1] to [7], wherein the amount of displacement of the touch roller is determined by measuring the strain given to the support for the touch roller.

[9] The method for evaluating the sag of a sheet of [8], wherein the touch roller is fixed to one end of a plate spring, a strain sensor-fitted support is fixed to the other end of the plate spring, and the amount of displacement of the touch roller is determined by measuring the strain of the support with the strain sensor.

[10] The method for evaluating the sag of a sheet of [9], wherein a first roller and, as spaced from the first roller, a second roller are arranged, the sheet is conveyed from the first roller toward the second roller while kept in contact with the first roller and the second roller so that the two rollers can rotate in the same direction, and the touch roller is arranged in the area between the first roller and the second roller.

[11] The method for evaluating the sag of a sheet of [10], wherein the touch roller is moved just below the first roller while kept away from contact with any one before the measurement of the amount of displacement with the touch roller, then the touch roller is moved vertically upwardly while the strain of the support is measured with the strain sensor, and the point at which the touch roller comes to be in contact with the first roller and the measured strain value begins to change is taken as the zero point of the strain sensor.

[12] The method for evaluating the sag of a sheet of [10] or [11], wherein the touch roller is moved just below the first roller while kept away from contact with any one before the measurement of the amount of displacement with the touch roller, then the touch roller is moved vertically upwardly while the strain of the support is measured with the strain sensor, from the point at which the touch roller comes to be in contact with the first roller and the measured strain value begins to change, the amount of vertical movement is displaced in a few steps to read the measured strain value, then the gain parameter is corrected so that the read value could be the amount of displacement of the touch roller to thereby adjust the sensitivity of the strain sensor.

[13] The method for evaluating the sag of a sheet of any one of [10] to [12], wherein the tension of the sheet is measured with a tension sensor, and the measured result of the amount of displacement of the touch roller is corrected by the measured tension.

[14] A device for evaluating the sag of a sheet, comprising two rollers as spaced from each other for conveying a sheet, a touch roller capable of being pressed against the surface of the sheet conveyed between the two rollers, and a means for measuring the amount of displacement of the touch roller in the direction vertical to the sheet face.

[15] The device for evaluating the sag of a sheet of [14], wherein the touch roller is fixed to one end of a plate spring, a strain sensor-fitted support is fixed to the other end of the plate spring, and a strain sensor for measuring the strain of the support is fitted to the support.

Advantage of the Invention

According to the sag evaluation method of the invention, the sag of a sheet can be evaluated with accuracy and in a simplified manner while the sheet is conveyed. The sag evaluation device of the invention has a relatively simple structure and its maintenance is easy, and using the device, the sag of a sheet can be evaluated with accuracy.

Figure 1:
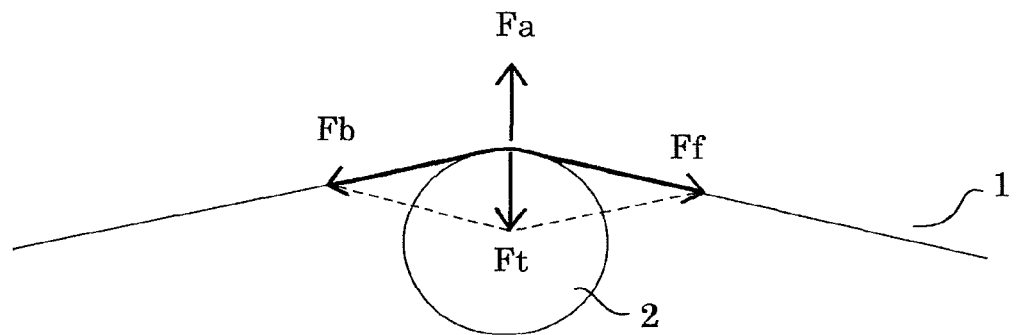
FIG. 1 It is an outline view explaining the power relationship in pressing a touch roller against a sheet.

In the drawings, 1 is a sheet, 2 is a touch roller, 3 is a rotor, 4 is a shaft, 5 is a bearing support, 6 is a plate spring, 7 is a support plate, 8 is a horizontal plate, 9 is a vertical plate, 10 is a fixed plate, 11 is a ranging sensor, 12 is light (laser), 13 is a strain sensor, 14 is a motor for z-direction movement, 15 is a screw, 16 is a motor for x-direction movement, 17 is a screw, 18 is a rotation axis, 21 is a control mechanism, 22 is an output mechanism, 23 is CPU, 24 is an A/D converter, 25 is a motor driver, 26 is a display, 27 is a printer, 28 is a tension sensor, 29 is an A/D converter, 30 is a backup roller, 31 is a sheet pass line.

BEST MODE FOR CARRYING OUT THE INVENTION

The sheet sag evaluation method and device of the invention are described in detail hereinunder. The description of the constitutive elements of the invention given hereinunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

(Sheet to be Evaluated)

The sheet sag evaluation method of the invention is a method for evaluating the sag of a sheet under tension (for example, during conveyance). Sheets are conveyed in various stages before use. For example, in winding up a sheet into a roll after its production, or in rewinding a wound sheet around another roll core, or in unrolling a rolled sheet before use, the sheet is conveyed in the longitudinal direction. In addition, in surface treatment of a sheet or in applying a sheet to an object, the sheet is also conveyed. To the sheet thus conveyed in a space, or that is, a continuous sheet that is conveyed via rollers or the like in the longitudinal direction, the sag evaluation method of the invention is widely applicable. As applicable to a sheet being conveyed, the sag evaluation method of the invention is easily applicable to an actual sheet production line or sheet processing line, and is characterized in that its industrial applicability is high.

A sheet is conveyed under tension. In general, a sheet is conveyed under tension in the sheet-traveling direction. For example, there is mentioned an embodiment of conveying a sheet in a space under tension in the sheet-traveling direction by hanging a sheet on rotating drive rollers, or by sandwiching a sheet between a rotating drive roller and nip roller, or by using a winging unit. The conveying speed may be, for example, from 5 to 2000 m/min, preferably from 10 to 350 m/min, more preferably from 30 to 200 m/min. The sag evaluation method of the invention is applicable to the sheet thus being conveyed in a space. "Conveying in a space" as referred to herein means that a sheet is conveyed not in contact with anything on both sides thereof. Accordingly, this does not include an embodiment of conveying a sheet while mounted on a pedestal.

The material of the sheet to be evaluated in the invention is not specifically defined. For example, the invention is applicable to a sheet formed of a material of plastics, paper, metals or the like; and above all, the invention is preferably applicable to a sheet formed of plastics or paper. The thickness of the sheet is not also specifically defined. In general, the invention may be applied to a sheet having a thickness of from 10 μm to 1 mm, preferably from 30 μm to 350 μm. The evaluation method of the invention is applicable to sheets of various forms capable of being conveyed in a space. One typical form is a sheet having a predetermined width and having a longitudinal direction longer than the width. In industrial use, the method is favorably applied to a sheet that may be wound up into a roll.

(Touch Roller and Displacement Measuring Mechanism)

In the evaluation method of the invention, a touch roller is pressed against the surface of a sheet being conveyed in a space.

The touch roller has at least a rotor rotatable in the sheet-traveling direction when in contact with a sheet being conveyed, and a shaft for rotating the rotor. The material of the touch roller is not specifically defined. The material is preferably one that is deformed little by stress and has good abrasion resistance, and for example, a touch roller formed of a material of metals, minerals, ceramics, glass, engineering plastics or the like may be mentioned. Above all, preferably used herein is a touch roller formed of a metal such as stainless steel or the like. The shape of the rotor constituting the touch roller is not specifically defined, but preferred is one having a width in some degree for the purpose of evading concentration of local stress in a sheet. For example, the width may be from 10 to 100 mm or so. Within the range, the width is preferably from 30 to 100 mm from the viewpoint of preventing the sheet from being scratched. From the same viewpoint, the surface of the rotor on the sheet contact side is flat in the center and is tapered toward both sides. The rotor is so constituted that it is rotatable so as not to interfere with the sheet conveyance. For easy rotation of the rotor, the rotor may be provided with a bearing mechanism such as a ball bearing, a fluid-assisted bearing (for example an oil bearing) or the like. The touch roller is so planned that it is movable in the vertical or nearly vertical direction relative to the sheet face in accordance with the tension of the sheet being conveyed, and when pressed against the sheet being conveyed, this receives a force corresponding to the sag of the sheet and is thereby displaced. In the evaluation method of the invention, the amount of displacement of the touch roller in the vertical direction in this stage is measured.

FIG. 1 shows a condition where a touch roller 2 is pressed against the sheet 1 being conveyed from the left to the right in the drawing, by a force of Fa acting in the upward direction. The sheet is conveyed under tension, and therefore, a force Ft synthesized by Ff and Fb of the tension is given to the touch roller 2. In this state, when the upward force Fa is not equal to the downward force Ft, then the touch roller 2 moves in any of upper or lower direction; and at a point at which these forces are equal, the touch roller stops. In case where the pressing force Fa to the touch roller is all the time kept constant, the touch roller stopping position shall be determined in accordance with the tension given to the sheet 1. Specifically, at the site where the sheet 1 sags, the tension which the touch roller receives is small, and therefore the touch roller 2 stops on the upper side; but on the contrary, at the site where the sheet sags little, the tension which the touch roller receives is large and therefore the touch roller 2 stops on the lower side. In the invention, the amount of upper and lower displacement of the touch roller is measured to thereby evaluate the sag of the sheet.

The sheet-traveling direction and the touch roller-pressing direction are not always defined in the directions shown in FIG. 1. For example, in FIG. 1, the touch roller may be pressed against the sheet downwardly from the upper side. The sheet may be conveyed in the vertical direction from the lower side to the upper side and the touch roll may be pressed against the sheet in the horizontal direction. The angle at which the touch roller is pressed against the sheet is, in general, vertical or nearly vertical to the sheet face. The thus-pressed touch roller may be displaced in the vertical or nearly vertical direction to the sheet face, in accordance with the sag of the sheet.

The amount of displacement of touch roller as referred to in the invention means the distance from a specific reference point. The way of setting the reference point is not specifically defined. Preferably, the condition with no sheet sag is considered as an ideal condition, and the amount of displacement of touch roller in this condition is taken as zero. More concretely, the amount of displacement of touch roller is preferably measured, based on the point at which the touch roller is contacted with a roller (backup roller) and which is taken as a zero point.

Figure 2:
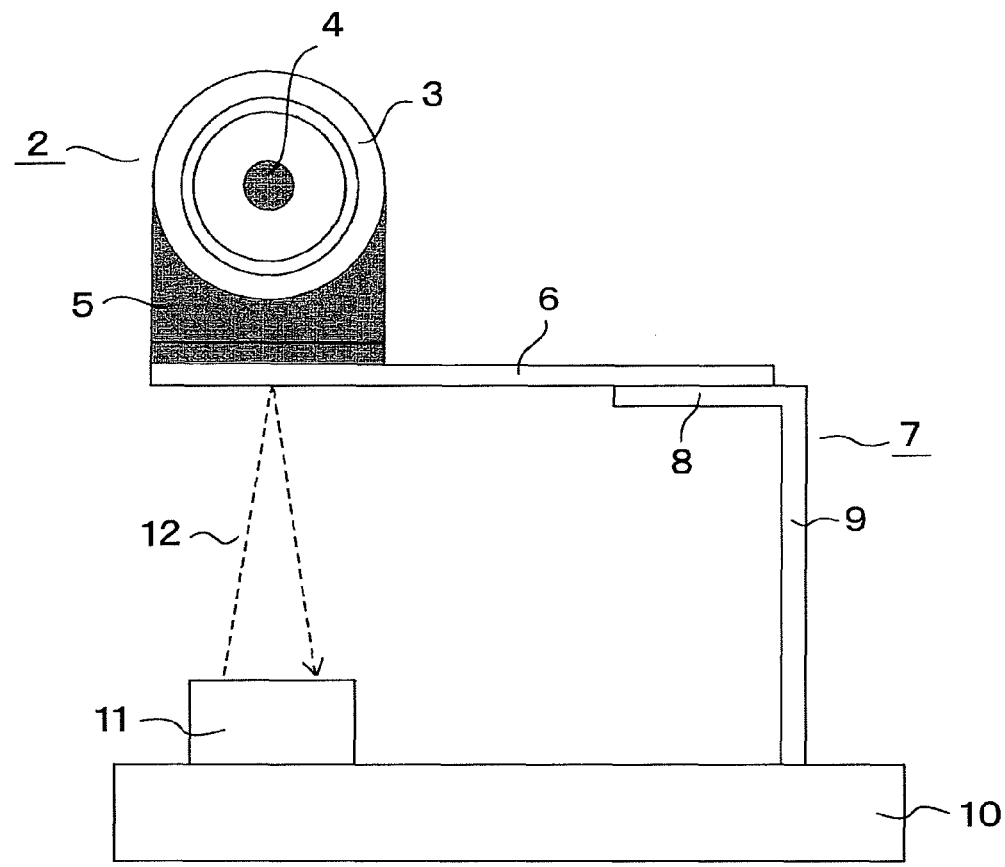
FIG. 2 It is a side view showing one embodiment of a mechanism of measuring the amount of displacement of a touch roller.
Figure 3:
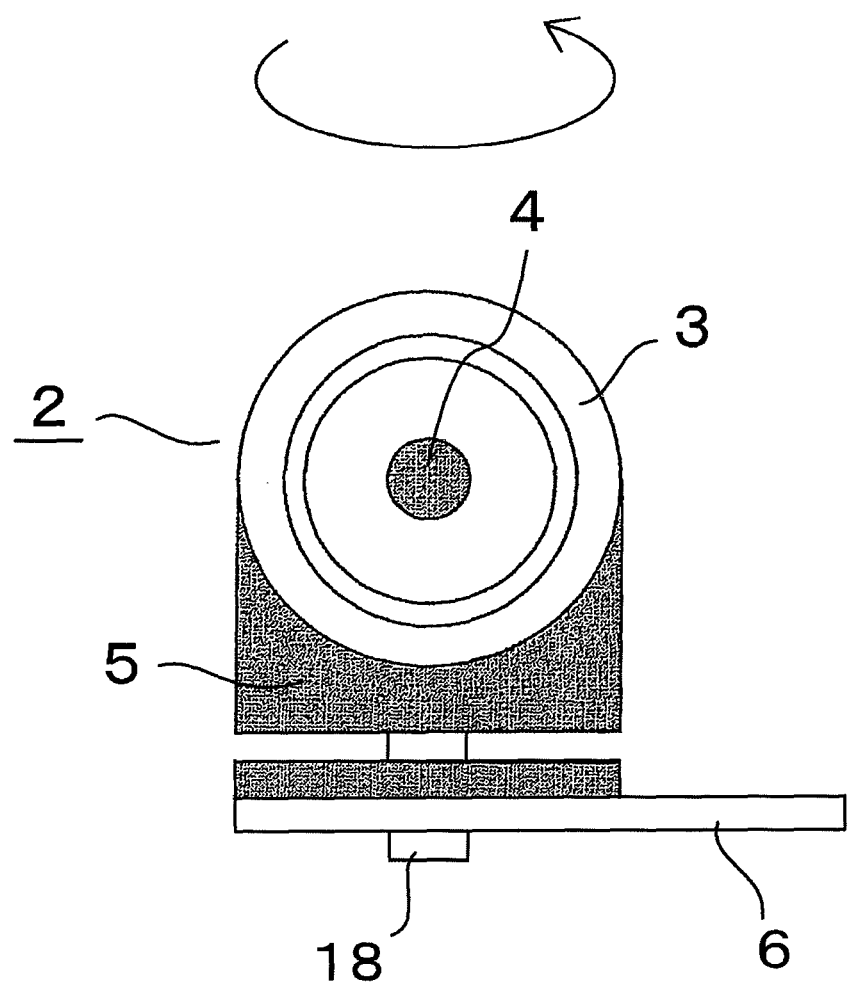
FIG. 3 It is a side view showing one embodiment of a structure of a rotatable touch roller.

As the mechanism of measuring the amount of displacement of touch roller, for example, the mechanism illustrated in FIG. 2 may be shown as an example. In the mechanism of FIG. 2, the touch roller 2 composed of a rotor 3, a shaft 4 and a bearing support 5 is fixed on the left end of a plate spring 6. The shaft 4 is fixed to the bearing support 5, and the rotor 3 is rotatable around the shaft 4 as the center. The shaft 4 and the bearing support 5 may be formed of the same material and may be an integrated member. The bottom of the bearing support 5 is fixed onto the left end of the plate spring 6 with a screw (not shown); however, as in FIG. 3, the touch roller 2 may be constituted rotatably around the rotary shaft 18. The lower face on the right end of the plate spring 6 is fixed to the upper face of the horizontal plate 8 of the L-shaped support plate 7 composed of the horizontal plate 8 and the vertical plate 9 connecting with each other, with a screw (now shown). The lower end of the vertical plate 9 is fixed to the fixed plate 10 of metal, and the fixed plate 10 is further fixed to a moving device capable of moving the plate 10 in the horizontal direction and the vertical direction with a motor. To the fixed plate 10, fitted is the ranging sensor 11, as positioned below the touch roller 2. The ranging sensor 11 measures the amount of displacement of the touch roller 2 that is displaced after receiving the downward pressure, by the light (laser) 12, IR ray, ultrasonic waves or the like. Using the mechanism of FIG. 2, the amount of displacement of the touch roller can be directly measured.

The mechanism shown in FIG. 2 may be variously modified in the manner obvious to anyone skilled in the art. For example, a mechanism comprising an arm structure and an elastic element such as a spring may be employed in place of the plate spring 6. In place of the noncontact ranging sensor 11, also employable is a displacement sensor such as a contact differential transformer, a contact or noncontact linear gauge, a noncontact magnetic sensor or the like.

Figure 4:
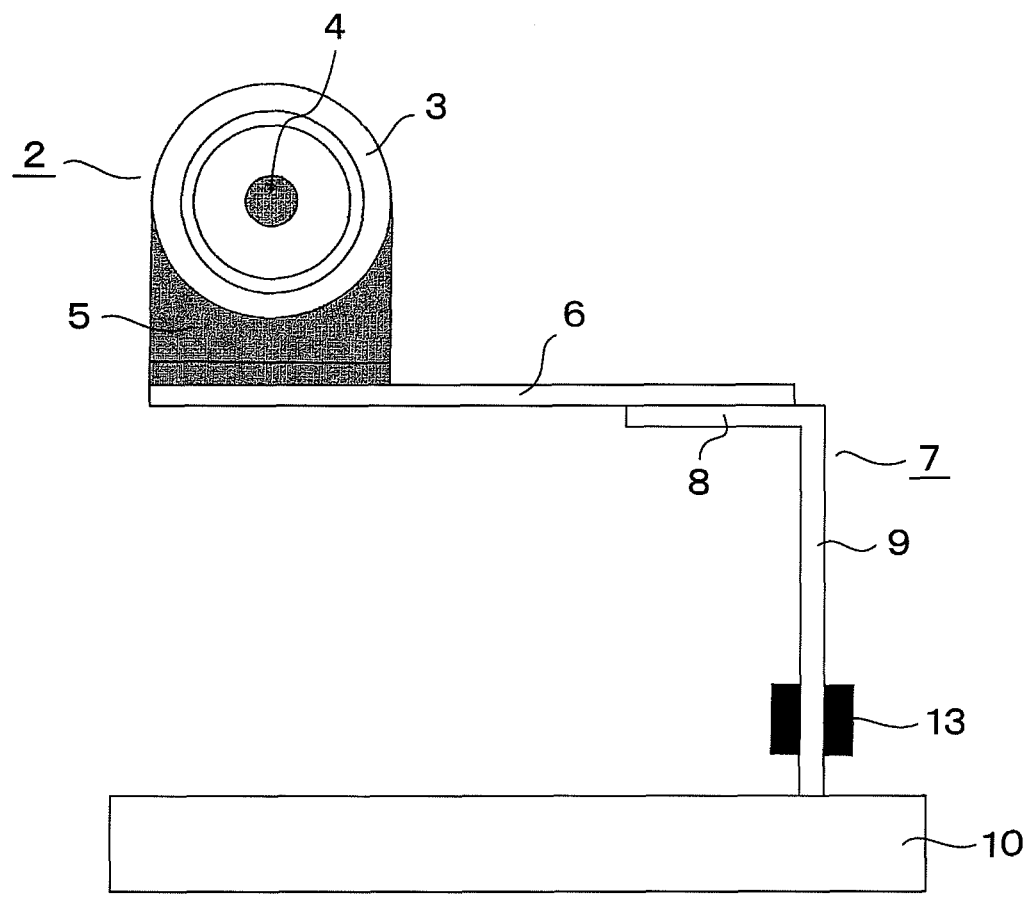
FIG. 4 It is a side view showing another embodiment of a mechanism of measuring the amount of displacement of a touch roller.

Another mechanism of measuring the amount of displacement of touch roller is, for example, the mechanism shown in FIG. 4. In the mechanism of FIG. 4, a strain sensor 13 is fitted to the vertical plate 9, in place of the ranging sensor 11. In case where the touch roller 2 received a downward pressure, the left end of the plate spring 6 is bent downwardly, and in accordance with it, then the vertical plate 9 constituting the support 7 is thereby warped, and the strain sensor 13 detects and measure the strain amount. Like a strain gauge, the strain sensor 13 may output the detected strain amount as a voltage. It has been confirmed that the voltage in this stage is in a linear relationship relative to the amount of replacement of the touch roller measured by the mechanism of FIG. 2. Accordingly, the relational formula between the voltage and the amount of displacement is previously determined, and the absolute value of the amount of displacement of the touch roller can be determined using the mechanism of FIG. 4. In the invention, it is not always necessary to convert the absolute value of the amount of displacement of the touch roller for evaluating the sag of the sheet in the invention. Accordingly, the case of obtaining the data that are in a linear relationship relative to the amount of displacement of the touch roller, like the voltage in the mechanism of FIG. 4, is within the scope of the concept of "measuring the amount of displacement of touch roller" in the invention. Use of the mechanism shown in FIG. 4 enables stable measurement, as hardly bringing about measurement error or failure owing to the dust of paper powder or the like.

Obvious to anyone skilled in the art, various modifications may be given also to the mechanism of FIG. 4 for the purpose of measuring the amount of displacement. For example, the amount of displacement transmitted from the touch roller may be measured with a piezoelectric sensor or the like taking advantage of a piezoelectric effect, fitted in place of the strain sensor 13. To that effect, the sensor that directly perceives and detects a force is generically referred to as a force sensor.

Figure 5:
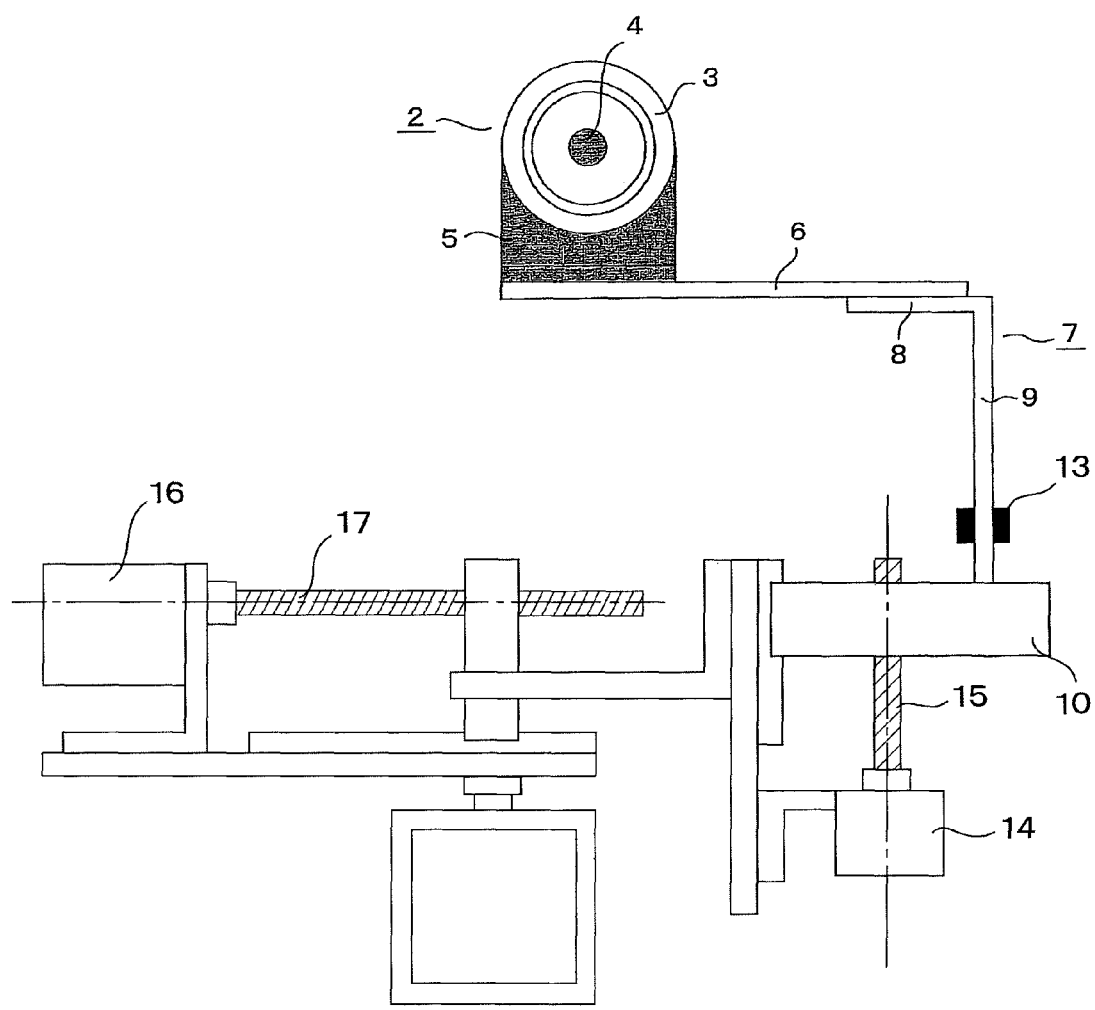
FIG. 5 It is a side view showing one embodiment of a mechanism of moving the installation position for a touch roller.

FIG. 5 is a side view showing one embodiment of a mechanism of moving the installation position for touch roller. In this, the horizontal direction in the drawing is defined as an x-direction; the direction perpendicular to the paper face is as a y-direction; and the vertical direction in the drawing is as a z-direction. The z-direction movement of the touch roller is attained by a mechanism comprising a motor 14 for z-direction movement, a screw 15 with a male screw engraved on the outer periphery thereof and a fixed plate 10 with a female screw running through it threadably with the male screw. Specifically, the screw 15 is rotated by the motor 14 for z-direction movement, whereby the fixed plate 10 and the touch roller are moved in the z-direction. Similarly, the screw 17 is rotated by the x-direction movement motor 16, whereby the touch roller is moved in the x-direction. Though not shown, the touch roller may also be moved in the y-direction by the same mechanism. For the y-direction movement, a timing belt or a still belt may also be used in addition to the screw.

(Control Mechanism and Output Mechanism)

Next described are the control mechanism and the output mechanism for the mechanism for measurement of the amount of displacement of touch roller. Herein as one example, described are the control mechanism and the output mechanism for the displacement measuring mechanism of FIG. 4, with reference to FIG. 6.

Figure 6:
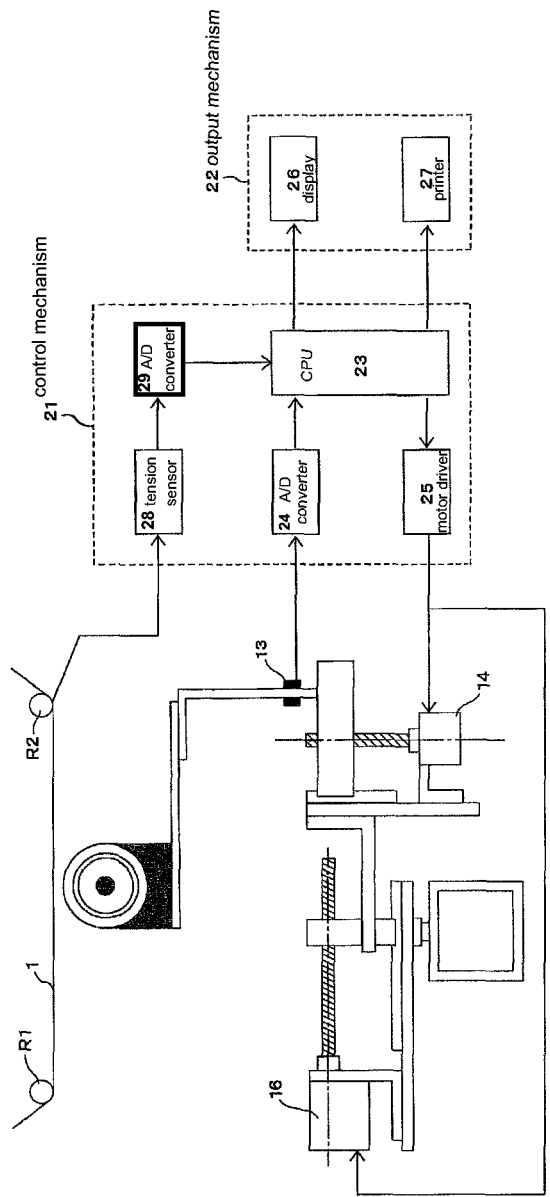
FIG. 6 It is an outline view showing the relationship between a displacement amount-measuring mechanism, a control mechanism and an output mechanism.

The control mechanism 21 in FIG. 6 comprises a CPU (central processing unit) 23, an A/D converter 24, a motor driver 25, a tension sensor 28, and an A/D converter 29; and the output mechanism 22 comprises a display 26 and a printer 27. The CPU 23 transmits instructions to the motor driver 25 for determining the position at which the touch roller 2 is pressed against the sheet 1. In accordance with the sag of the sheet being conveyed, the touch roller 2 receives a downward pressure and the strain sensor 13 outputs it as a voltage, whereupon the A/D converter 24 converts the output data into digital data and leads them to the CPU 23. The tension sensor 28 measures the sheet tension given to the roller R2, and the A/D converter 29 converts the found data into digital data and lead them to the CPU 23. These are suitably processed for correction or the like in the CPU 23, and then the data are digitalized or graphed according to the output circuit and displayed on the display 26, and they are printed with the printer 27.

(Process of Sheet Sag Evaluation)

Concretely described is the process of evaluating the sag of a sheet by pressing a touch roller against the surface of the sheet being conveyed in a space, using a device equipped with a displacement measuring mechanism, a control mechanism and an output mechanism. In this, for convenience sake for explanation, the sheet-traveling direction is x-direction, the cross direction of the sheet (the direction perpendicular to the traveling direction in the sheet plane) is y-direction, and the direction perpendicular to the sheet plane is z-direction. As the displacement measuring mechanism, referred to is the mechanism shown in FIG. 4 as one example.

First, sensor sensitivity adjustment and zero point adjustment are attained prior to actual measurement. In the state where the touch roller is not in contact with anything, the output from the strain sensor 13 is inputted via the A/D converter 24, and the strain sensor output data are read as the zero data. The sensor output data are recorded and is used for the subsequent zero correction. By the x-direction movement motor 16, the touch roller is moved just below the backup roller 30 (left position in FIG. 7). Next, by the z-direction movement motor 14 in FIG. 6, the touch roller is moved upwardly, and with reading the strain sensor output data on the A/D converter 24, the point at which the strain sensor output data have begun to change is checked. From the start point for the contact thereof, the touch roller is pressed against the backup roller in a few stages of the feed from the motor, and the output data at each position are recorded. The recorded data are compared with the ideal output characteristics; and when the former are lower, then the gain parameter for correcting the read data is increased, but on the contrary case, the parameter is lowered for correction. These operations are carried out for all the strain sensors used in the sag evaluation in the invention. In addition, the series of these operations is previously programmed in a computer, and according to the direction by the CPU 23, these may be automatically carried out via the motor driver 25 and the A/D converter 24.

Figure 7:
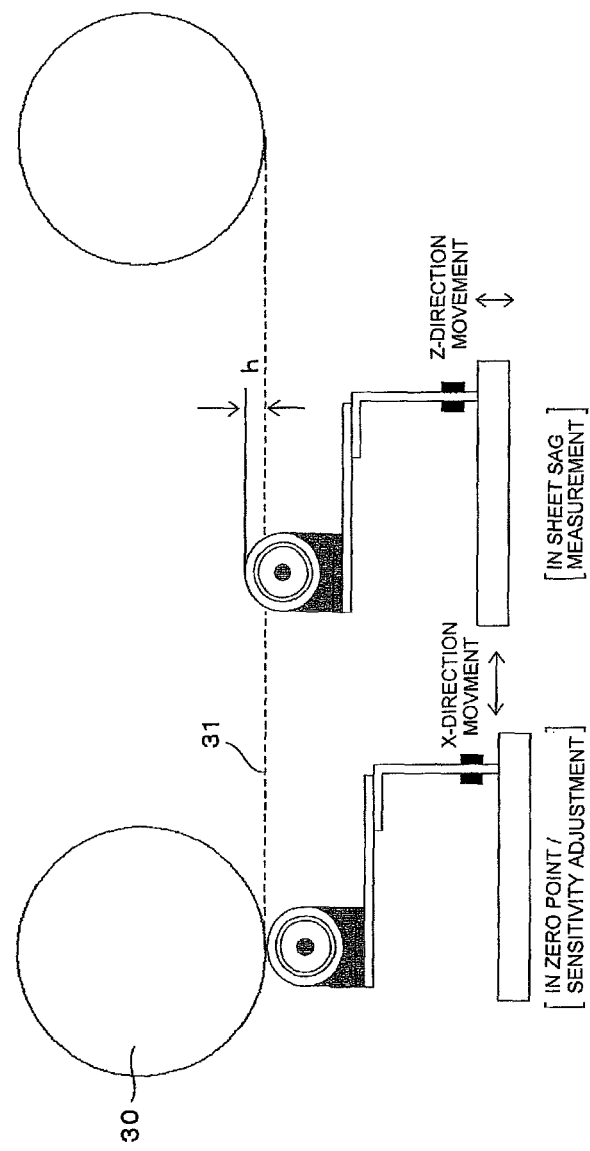
FIG. 7 It is an outline view explaining the position of a touch roller in sag evaluation.

After the sensitivity adjustment and the zero point adjustment, the touch roller is moved to the measurement point from just below the backup roller (right position in FIG. 7). In this, in general, the touch roller is moved in the x-direction and the z-direction, but it may be moved in the y-direction. The z-direction movement makes the touch roller pressed against the sheet. Relative to the sheet pass line 31 in the state where the touch roller is not in contact with the sheet, the touch roller is set higher by h as in FIG. 7 for the measurement. Preferably, the strain sensor is so controlled that the output voltage from it is 0 V when the touch roller has received no pressure from the sheet, and when the touch roller has received a downward pressure from the sheet, then the sensor could output a voltage of from more than 0 V to 5 V via an amplifier. Also preferably, the mean voltage during continuous measurement of the sheet being conveyed is controlled to be from 2 to 3 V. The voltage control may be attained by suitably determining the measurement point with monitoring the output level from the strain sensor. The output data from the strain sensor are inputted into the CPU 23 via the A/D converter 24 as so mentioned in the above.

The output data from the strain sensor are corrected in the CPU 23. For this, preferred is correction by the sheet tension. Since the sheet is conveyed under tension, the touch roller 2 receives the downward force Ft produced by the tension Ff and Fb, as shown in FIG. 1. In case where the tension is all the time constant, the force Ft is constant; but in an actual sheet production line, the tension to the sheet always fluctuates owing to the disturbance factors such as temperature fluctuation, etc. Accordingly, the sheet tension is monitored with the sensor 28 via the roller used for conveying the sheet, and the detected data are converted into digital data in the A/D converter 29 and led to the CPU 23. In the CPU 23, the output data from the strain sensor are corrected in accordance with the sheet tension, and the sheet sag can be thereby evaluated accurately. In particular, in evaluating the trend of the sag in the sheet-traveling direction, this correction is useful.

The sag data corrected in the CPU 23 may be displayed on the display 26 as numerical data or graphs, and may be printed with the printer 27. The obtained sag data can be utilized for controlling the devices for correcting the sag, or for evaluating the practicability of the sheet.

(Measurement Position)

According to the sag evaluation method of the invention, the sag of a sheet being conveyed can be evaluated at any desired position. For example, in case where the center part in the cross direction of a sheet being conveyed is desired to be monitored, the touch roller may be pressed against the center part in the cross direction of the sheet for evaluating the sag of the sheet. In case where plural sites of a sheet are desired to be monitored at the same time, a number of touch rollers corresponding to the number of the measurement sites are prepared, and the sag of the plural sites of the sheet may be evaluated continuously. In this case, when the touch rollers are arranged in the cross direction of the sheet, as spaced from each other at suitable intervals therebetween, then the sag profile in the cross direction can be formed. For example, for evaluating the sag of a sheet having a width of 500 mm, five touch rollers may be arranged in parallel in the cross direction of the sheet and the invention may be carried out.

The touch roller is not always required to be fixed in a specific position for the measurement, but may be moved along the sheet face during the measurement. For example, with moving them in the cross direction of a sheet, different sites of the sheet may be measured to form a sag profile in the cross direction of the sheet. In this case, plural touch rollers may be moved and operated simultaneously for measurement, and the sag profile can be formed efficiently. For example, there is mentioned an embodiment where two movable touch rollers are prepared, and one touch roller is moved back and forth from the center part to one end in the cross direction of the sheet being conveyed for the measurement, while the other touch roller is moved back and forth from the center part to the other end in the cross direction of the sheet being conveyed for the measurement. This method may be generalized as a method of measurement with n's movable touch rollers in which a sheet is divided into n's sections in the cross direction thereof.

(Evaluation)

Based on the amount of displacement of a touch roller obtained according to the invention, the sag of a sheet can be evaluated. Evaluation as referred to herein is meant to indicate the judgment of the value of a sheet regarding to the sag thereof, and therefore includes an extremely broad concept. For example, the level of sag may be evaluated in accordance with the absolute value of the amount of displacement of touch roller; or the magnitude of fluctuation of sag may be evaluated based on the fluctuation width of the amount of displacement of touch roller. In addition, based on the amount of displacement of touch roller measured under varied conditions of temperature and humidity, the change in the sag of a sheet by the environmental change may be evaluated; or based on the difference in the measurement result of the amount of displacement of touch roller owing to the difference in the material constituting the sheet, the sagging trend of the material may be evaluated.

The sag profile in the cross direction of a sheet formed according to the invention is correlated with the length profile in the cross direction of the sheet cut to have a predetermined length and given a tension in the longitudinal direction of the sheet. Accordingly, the evaluation method of the invention is utilizable for detection and evaluation of the length unevenness of a sheet under tension, and for improvement of the sag of the sheet associated with the evaluation.

The evaluation method of the invention is excellent in reproducibility. For example, using a roll of a sheet, the roll is unrolled and the thus-spread sheet is measured for the amount of displacement of the touch roller applied thereto, and then the sheet is again wound up into a roll, and thereafter the roll is still again unrolled and the thus-spread sheet is measured in the same manner as previously; and the amount of displacement and the profile obtained in this process are almost the same. In addition, in the sag evaluation method of the invention, the sheet does not have any additional sag or its surface is not scratched when the shape of the touch roller and the plate spring are changed.

EXAMPLES

The characteristics of the invention are described more concretely hereinunder with reference to Examples given below. In the following Examples, the material used, its amount and ratio, the details of the treatment and the treatment process may be suitably modified or changed not overstepping the sprit and the scope of the invention. Accordingly, the invention should not be limitatively interpreted by the Examples mentioned below.

Example 1

Figure 8:
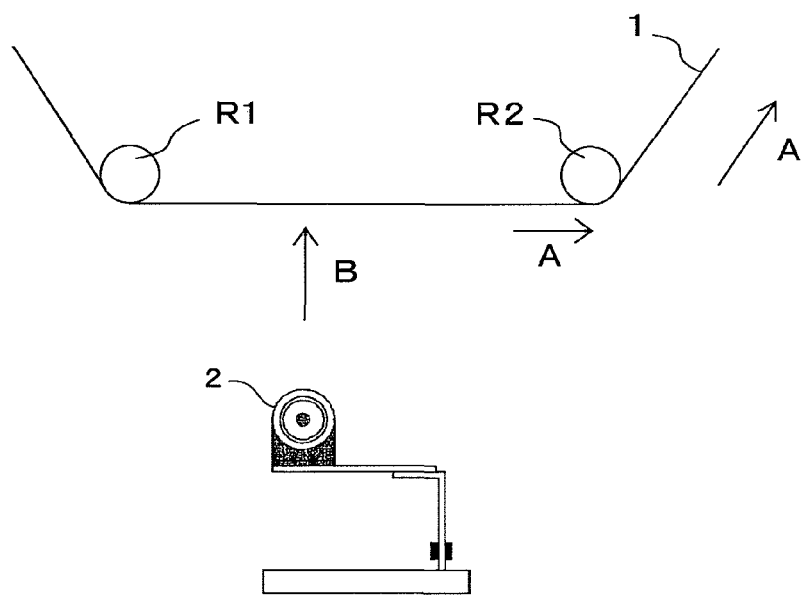
FIG. 8 It is an outline view explaining the sheet traveling direction and the touch roller pressing direction in Example.

A polypropylene sheet having a thickness of 80 μm and a width of 3,300 mm was conveyed via the first roller R1 and the second roller R2 in the direction A in FIG. 8, at a speed of 85 mm/sec. Eight touch rollers shown in FIG. 4 were prepared, and pressed against the sheet in the direction of B in FIG. 8. The eight touch rollers were pressed against the sheet at the sites of P1 to P8 in FIG. 9(*a*), a view of the sheet being conveyed seen in the direction of B in FIG. 8. Arranging the touch rollers at P1 to P8 enables the measurement even though the distance between the first roller R1 and the second roller R2 is short, and therefore makes it possible to efficiently utilize a limited space. Shortening the distance between the first roller R1 and the second roller R2 markedly enhances the measurement accuracy. The eight touch rollers were all regulated for zero point correction and sensitivity correction, each having a roller width of 50 mm. The sheet contact surface of the touch rollers is flat in the center part and is tapered toward both sides. The touch rollers were pressed against the sheet by moving them upwardly by 5 mm from the sheet pass line. The strain sensor was so controlled that, when the touch rollers are pushed downwardly by the sheet being conveyed, the sensor could output 1 V per 1 mm of the downward movement, via the amplifier. In this condition, the amount of displacement of the touch rollers was measured for 40 minutes, and the data were averaged. The averaged data were plotted on a graph, in which the horizontal axis indicates the distance to P1 to P8 from the sheet edge in the cross direction, and the vertical axis indicates the mean value of displacement of the touch rollers at the respective sites, therefore providing a cross-direction sag profile.

Example 2

Figure 9:
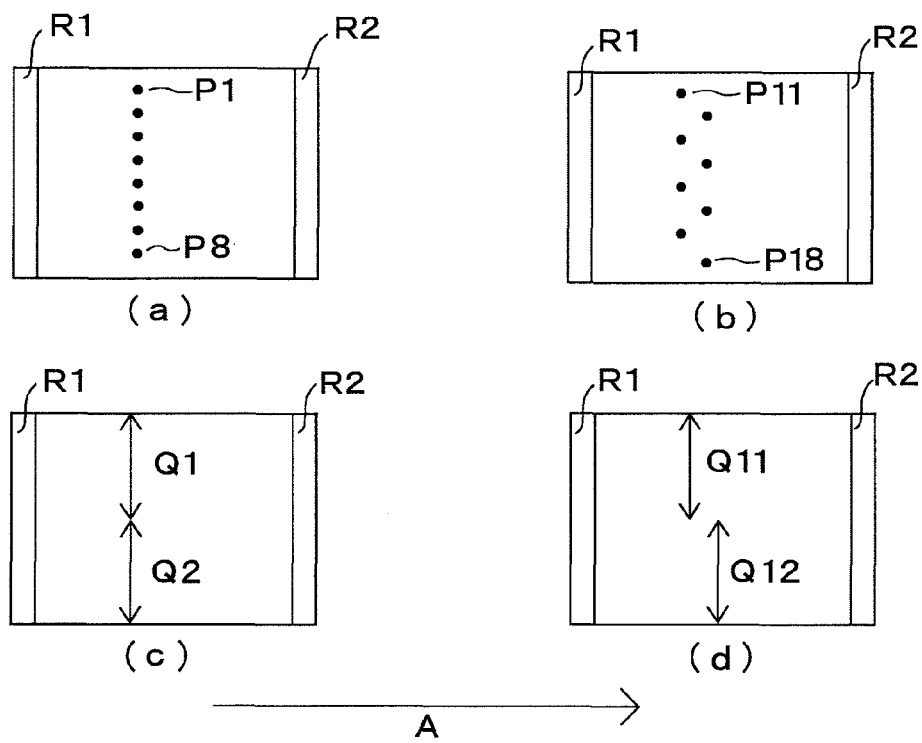
FIG. 9 It is an outline view explaining the touch roller pressing sites in Example.

A cross-direction sag profile was formed through the same measurement as in Example 1, for which, however, the touch rollers were pressed at the sites of P11 to P18 in FIG. 9(*b*) in place of P1 to P8. Alternately pressing the touch rollers at P11 to P18 as in FIG. 9(*b*) facilitates the formation of a sag profile in a densely divided region in the cross direction with evading the mutual contact of the touch rollers with each other, therefore enabling more accurate sag evaluation in the cross direction.

Example 3

A cross-direction sag profile was formed through the same measurement as in Example 1, for which, however, two touch rollers were prepared and each touch roller was moved back and forth in the region of Q1 and Q2 in FIG. 9(*c*), in place of pressing the touch rollers at the fixed points of P1 to P8. The frequency of the back-and-forth movement was once/min. In this case, the two touch rollers were moved in the same direction with the distance between the two kept all the time constant, whereby the two were prevented from being in contact with each other. Employing this embodiment enables efficient sag evaluation with a smaller number of touch rollers.

Example 4

A cross-direction sag profile was formed through the same measurement as in Example 3, for which, however, the touch rollers were moved back and forth in the region of Q11 and Q12 shown in FIG. 9(*d*), in place of the region of Q1 and Q2. Employing this embodiment enables free back-and-forth movement of the two touch rollers with preventing the two from being in contact with each other.

Example 5

The same measurement as in Example 1 was attained except that one touch roller was pressed at the center part in the cross direction in place of P1 to P8. The mean value per minute of the amount of displacement of the touch roller was computed, and the data were plotted on a graph in which the horizontal axis indicates the time and the vertical axis indicates the average value of displacement of the touch roller at the varying time, therefore providing a longitudinal-direction sag profile. Employing this embodiment makes it possible to know the change in the sag in the longitudinal direction.

The embodiment of Example 5 may be attained simultaneously with Examples 1 to 4.

Example 6

In Examples 1 to 5, the temperature condition and/or the humidity condition were changed to provide a sag profile of the same sheet. This shows how the sag of the sheet changes depending on the change in the environmental condition under which the sheet is left. Once the temperature condition and/or the humidity condition were changed, and again restored to the original one, and the sheet was measured under the restored original condition. Through the series of the measurement, the restorability (reversibility) of the sag change and the state of sag dissolution can be evaluated.

(Others)

The sag evaluation of the above Examples 1 to 5 was repeated more than once, and the reproducibility was all the time good. A rolled sheet was unrolled, again rolled up, and then unrolled and rolled up, and in each state, the sheet was evaluated for the sag. In every state, the sheet had almost the same result. The sheet surface was checked after the sag evaluation. The surface was not scratched and the sheet was not deformed.

The invention claimed is:

1. A method for evaluating sag of a sheet, the method comprising:
    pressing a touch roller to a surface of a sheet being conveyed in a space and measuring an amount of displacement of the touch roller to thereby evaluate the sag of the sheet at a position at which the touch roller is pressed against the sheet,
    determining the amount of displacement of the touch roller by measuring a strain of a support that supports the touch roller,
    the touch roller being fixed to one end of a plate spring, a strain sensor being fitted to the support which is fixed to another end of the plate spring, and
    determining the amount of displacement of the touch roller by measuring the strain of the support with the strain sensor.

2. The method for evaluating the sag of a sheet according to claim 1, wherein plural measurement points are set in a cross direction of the sheet, the amount of displacement of the touch roller is measured at each measurement point, and a sag profile in the cross direction is formed.

3. The method for evaluating the sag of a sheet according to claim 2, wherein the touch rollers are pressed individually against the plural measurement points and the amount of displacement of each touch roller is measured to form the sag profile in the cross direction.

4. The method for evaluating the sag of a sheet according to claim 2, wherein the touch roller is moved in the cross direction of the sheet to measure the amount of displacement of the touch roller at the plural measurement points, thereby forming the sag profile in the cross direction.

5. The method for evaluating the sag of a sheet according to claim 1, wherein a first roller and a second roller are arranged spaced from each other, the sheet is conveyed from the first roller toward the second roller while kept in contact with the first roller and the second roller so that the two rollers can rotate in the same direction, and the touch roller is arranged in an area between the first roller and the second roller.

6. The method for evaluating the sag of a sheet according to claim 5, wherein the touch roller is moved just below the first roller while kept away from contact with any one before the measurement of the amount of displacement with the touch roller, then the touch roller is moved vertically upwardly while the strain of the support is measured with the strain sensor, and the point at which the touch roller comes to be in contact with the first roller and the measured strain value begins to change is taken as a zero point of the strain sensor.

7. The method for evaluating the sag of a sheet according to claim 5, wherein the touch roller is moved just below the first roller while kept away from contact with any one before the measurement of the amount of displacement with the touch roller, then the touch roller is moved vertically upwardly while the strain of the support is measured with the strain sensor, from a point at which the touch roller comes into contact with the first roller and the measured strain value begins to change, the amount of vertical movement is displaced in a few steps to read the measured strain value, then a gain parameter is corrected so that the read value could be the amount of displacement of the touch roller to thereby adjust a sensitivity of the strain sensor.

8. The method for evaluating the sag of a sheet according to claim 5, wherein a tension of the sheet is measured with a tension sensor, and the measured result of the amount of displacement of the touch roller is corrected by the measured tension.

9. A device for evaluating the sag of a sheet, the device comprising:
    two rollers spaced from each other for conveying a sheet, a touch roller capable of being pressed against a surface of the sheet conveyed between the two rollers, and a measurer that measures an amount of displacement of the touch roller in a direction vertical to the surface of the sheet,
    a support that supports the touch roller and is configured such that the amount of displacement of the touch roller is determined by measuring a strain of the support, and
    the touch roller being fixed to one end of a plate spring,
    a strain sensor fitted to the support which is fixed to another end of the plate spring, and
    the strain sensor configured to measure the strain of the support to determine the amount of displacement of the touch roller.

10. The method according to claim 1, wherein the plate spring is bendable.

11. The device according to claim 9, wherein the plate spring is bendable.

* * * * *